United States Patent [19]
Harmon et al.

[11] 4,328,581
[45] May 4, 1982

[54] ADAPTIVE HF COMMUNICATION SYSTEM

[75] Inventors: James V. Harmon; Roger A. Kyllo, both of Cedar Rapids, Iowa

[73] Assignee: Rockwell International Corporation, El Segundo, Calif.

[21] Appl. No.: 161,523

[22] Filed: Jun. 20, 1980

[51] Int. Cl.³ .............................................. H04B 7/02
[52] U.S. Cl. ......................................... 371/8; 371/5; 375/38; 455/62
[58] Field of Search ............... 371/8, 5; 375/38, 58; 455/62, 63, 52

[56] References Cited

U.S. PATENT DOCUMENTS

| | | | |
|---|---|---|---|
| 3,001,064 | 9/1961 | Alexis et al. | 455/62 |
| 3,160,813 | 12/1964 | Biggi et al. | 455/62 |
| 3,487,312 | 12/1969 | Egan et al. | 455/62 |
| 3,532,988 | 10/1970 | Magnuski | 455/62 |
| 3,840,855 | 10/1974 | Ameau et al. | 371/5 |
| 4,063,174 | 12/1977 | Gupta et al. | 455/52 |
| 4,140,973 | 2/1979 | Stevens | 455/62 |
| 4,155,040 | 5/1979 | Harmon et al. | 455/62 |
| 4,179,661 | 12/1979 | Harris et al. | 455/158 |
| 4,179,662 | 12/1979 | Pflasterer | 455/165 |
| 4,241,445 | 12/1980 | Payen | 371/8 |

OTHER PUBLICATIONS

J. V. Harmon, Automatic Connectivity for HF Voice and Low Speed Data Communication Systems, IEEE—Colloquim Digest 1979/48, Feb. 27, 1979, London.

*Primary Examiner*—Charles E. Atkinson
*Attorney, Agent, or Firm*—Richard K. Robinson; Harold R. Greenberg; H. Fredrick Hamann

[57] ABSTRACT

A high frequency communication system has at least two stations with each station having a discrete address, a transmitter, a receiver and a means for selecting the preferred frequency for transmitting at least a preselected format between the station includes a means for sequentially tuning the receiver through a group of channels with each channel having a preselected frequency and bandwidth, a means for measuring the link quality of each channel that is received according to the discrete address of the station transmitting the message. After the link quality is measured it is stored in a link quality matrix according to the channel and address of the station transmitting the message, so that when transmission is initiated by the station receiving the message it may select the channel with the best link quality and initiate transmission on that channel if it is available.

12 Claims, 12 Drawing Figures

ADAPTIVE HF COMMUNICATION SYSTEM

BACKGROUND OF THE INVENTION

This invention relates to high frequency (HF) communication systems.

High frequency radio has traditionally been a medium used to provide economical, long and short distance non-line-of-sight communications. However, there are problems associated with the use of a high frequency communication system. Some of the problems associated with high frequency systems were disclosed and recommendations made in an IEE (Institute of Electrical Engineers) paper by J. V. Harmon published as part of Colloquium Digest 1979/48, on Feb. 27, 1979, in London.

One method of addressing the problems enumerated in the above reference was addressed in U.S. patent application Ser. No. 4,140,973 entitled, "Channel Evaluation Apparatus For Point to Point Communications." It disclosed a point to point high frequency communication system that has a first set of frequency channels for transmission between a first terminal and a second terminal and a second set of frequency channels for transmitting between the second terminal and the first terminal. The channel evaluation apparatus includes a sounding transmitter and receiver in each terminal. These equipments operate in parallel with the angular communication system and provide the facility for real time evaluation of all assigned channels using a sampling technique. Each sounding transmitter periodically transmits sounding signals and time sequence through its respective frequency channels to the sounding receiver at the other terminal. The sounding signals for each channel are evaluated for transmission quality and this information is displayed. The operator at each terminal may manually or automatically determine the desired channel of reception and this information, which is then encoded on the sounding signals transmitted to the other terminal, is used by the operator at the other terminal to set the communication channels.

U.S. Pat. No. 4,155,040 disclosed an RF communications system that assures selection of the optimum frequency for establishing a communications path between two stations by employing scanning transceivers which may be operated on a plurality of channels having programmed frequencies wherein the programmed frequencies in one transceiver may be automatically changed from another transceiver after establishing a communications path over one of the channels and, when calling another transceiver, the calling transceiver automatically reverts to the same channel last used for communications contact with the called transceiver.

SUMMARY OF THE INVENTION

It is desirable to provide a communication system that will automatically select the best frequency for transmitting information between two stations. In the past, the complexity of dealing with HF propagation vagaries required the use of skilled radio operators. As a result, the usefulness of high frequency communication systems was limited when trained operators were not available. One solution to these problems has been found by the use of microprocessor technology to reduce operator workload through increased communication automation.

A high frequency communication system has at least two stations with each station having a discrete address, a transmitter, a receiver and a means for selecting the preferred frequency for transmitting at least a preselected format between the stations, including a means for sequentially tuning the receiver through a group of channels with each channel having a preselected frequency, mode, and bandwidth, and a means for measuring the link quality of each channel on which a transmission is received according to the discrete address of the station transmitting the message. After the link quality is measured it is stored in a link quality analysis matrix according to the channel and the address of the station transmitting the message, so that when a call is initiated by the station receiving the message it may select the channel with the best link quality and initiate transmission on that channel, if it is available.

The link quality analysis includes a means for measuring the signal to noise factor and for obtaining a bit error rate factor and combining the two factors and storing the link quality in the memory of the processor. There is a priority assigned to the channel with the best link quality and when a call is initiated to a remote station, the disclosed communication system will automatically select the preferred channel for transmission to that remote station. In addition, a channel available sensor is also provided so that the transmitting station will first monitor the seleced channel to ensure that it is not being utilized prior to initiating a transmission.

An additional feature to the invention is the capability of periodically degrading the link quality factors stored in memory if there is no activity on that channel so that if conditions change over a period of time, then the link quality factor stored for a given channel and address will be degragated until it is updated by the receipt of a transmission from that given station on that channel. If no update is received, the link quality factor will eventually go to zero over a period of time.

The advantages and objects of the invention, and the means by which they are achieved may be best appreciated by referring to the Detailed Description of the Preferred Embodiment which follows hereafter together with the appended drawings.

DETAILED DESCRIPTION OF THE PREFERRED EMBODIMENT

Figure 1:
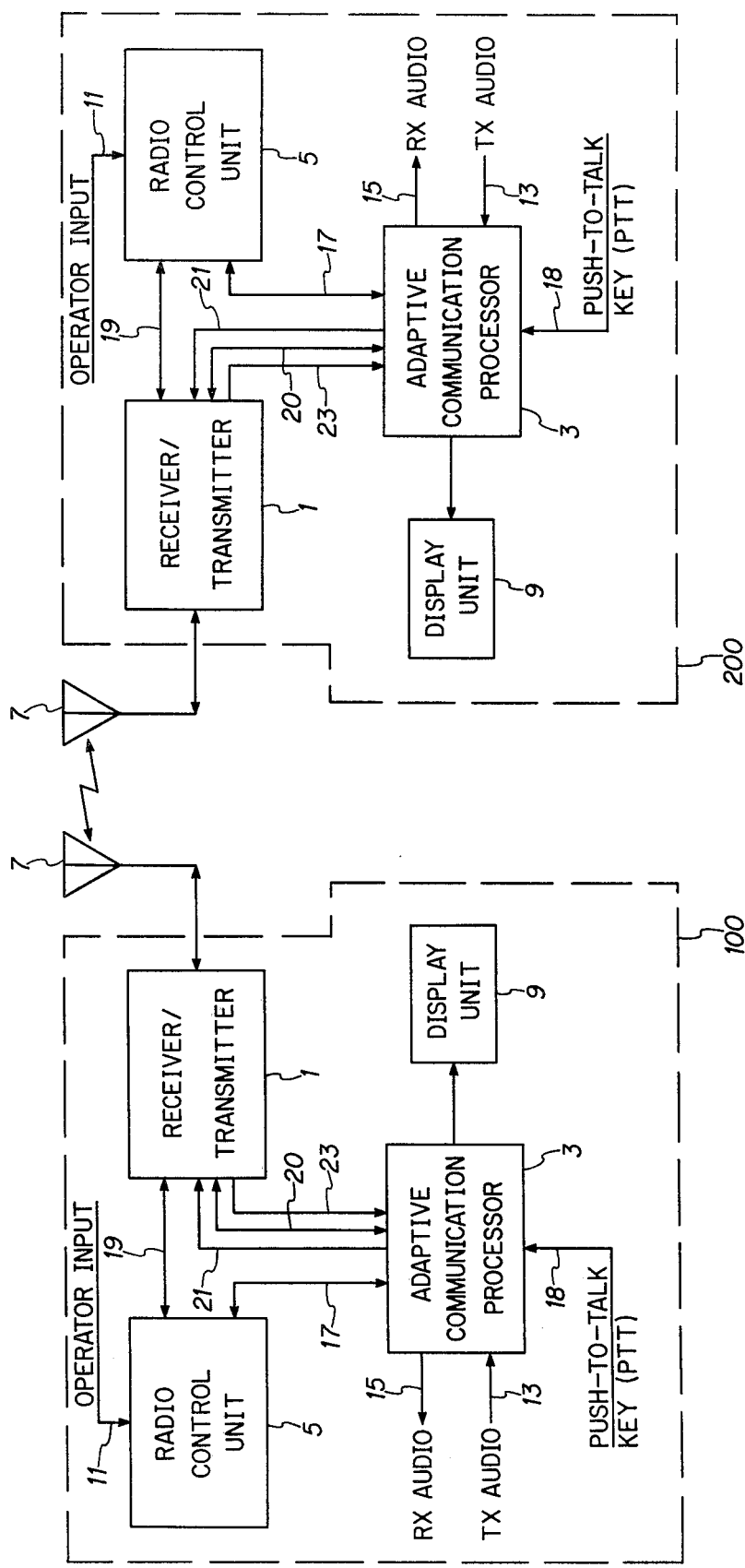
FIG. 1 is a block diagram of a High Frequency (HF) communication system with an Adaptive Communication Processor according to the invention.

In FIG. 1, to which reference should now be made, there is shown a block diagram of a high frequency (HF) communication system that has at least two stations with discrete addresses. Each station has a receiver/transmitter 1, an Adaptive Communication Processor 3, a radio control unit 5, an antenna 7, and an optional display unit 9. The receiver/transmitter 1 must be capable of being remotely tuned, and in the preferred embodiment, provide a system fault indication if there is a malfunction in the unit. An example of a commercial available receiver/transmitter that meets these functions is the model 7284-2 manufactured by Collins Telecommunications Products Division of Rockwell International Corporation of Cedar Rapids, Iowa 52406. The radio control unit must provide at least a terminal for the entry of an alphabetical, numeric or alphanumeric code for the "To" address that an operator desires to contact and in the preferred embodiment provide a means for the operator to terminate calls and also indicate when a call is in progress. An example of a unit that provides these functions is the model 514A-9 manufactured by the above referenced corporation. Each station is assigned a unique address that can be either alphabetical, numeric or alphanumeric code. For discussion purposes only, station 100 will be designated as the calling station and station 200 will be the called station. Prior to the initiation of a call to another station, the operator will enter the address of the station that is to be called by way of a data entry terminal not shown and through the operator input conductor 11 into the Adaptive Communication Processor via the radio control unit and conductor bundle 17. Upon the Adaptive Communication Processor 3 receiving a PTT (Push-to-Talk) key input via conductor 18 from the operator, the transmitting station 100 will begin an automatic sequence of events which will result in a communications link being established between station 100 and the second remote station 200. First the Adaptive Communication Processor will select from a group of channels common to both stations, the channel with the highest link quality and initiate a transmission to the station identified by the selected address on the preferred channel. The link quality analysis is stored in a memory unit within the Adaptive Communication Processor and is obtained either from the results of previous transmissions or provided by initialization data input to the system prior to initial operation. The receiving station 200 is constantly monitoring in a sequential order (scanning) the group of common channels on which it is capable of operating. When it receives an address message from the transmitter 100, it will sync upon the received message, decode the address information, recognize that the message is addressed "To" it, recognize the transmission came "From" station 100, disable the receive audio mute, disable the scanning sequence, and display the caller's address to the operator via the control unit 5. The called station 200 then transmits an answer to the calling station 100 on the same channel to verify that contact has been established. Station 100 which in a similar fashion, synchronizes its receiver upon the received message, decodes the "To" and "From" address information and verifies that the response is directed "To" station 100 "From" station 200 by displaying station 200's address on the radio control unit. At this point the calling station 100 is ready to transmit the audio provided by the operator on conductor 13 which can include any type of information including voice or data that the operator desires to transmit to the remote station 200. The operator of the remote station 200 is able to detect the information via conductor 15. Each time either station receives a "From" address transmission, the link quality memory is updated for link quality according to the channel that the receiving station receives the information on and the address of the transmitting station.

The radio control unit 5 provides control to both the Adaptive Communication processor 3 and the receiver/transmitter 1 via data bus 17 and 19 respectively and the Adaptive Communication Processor 3 has direct control interface with the receiver/transmitter 1 via control bus 20. The operator is prevented from transmitting the audio message by the automatic channel selection process until the Adaptive Communication Processor has established the data link on the best available communication channel.

During the time that the receiving station is sequencing through the group of channels, the receive audio line 15 at the receiving station 200 is muted by action of the Adaptive Communication Processor 3. Once the data link is established then the receiving station may receive and transmit voice or data audio from the receiver/transmitter via the Adaptive Communication Processor 3, and conductors 15 and 13, which are connected to an output audio terminal not shown.

Figure 2:
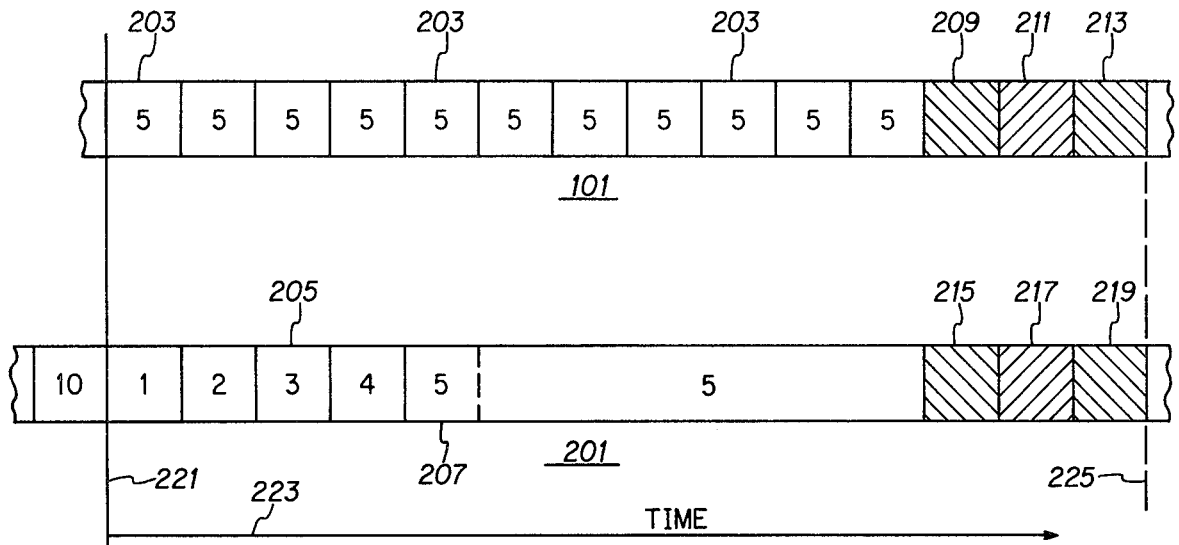
FIG. 2 is a timing diagram of the HF communication system according to the invention.

In FIG. 2, to which reference should now be made, there is shown a transmission timing diagram of the transmission between station 100 and 200. The timing diagram 101 is a diagram of the communication channels on which a call is being initiated by the station 100. The diagram is divided up into a plurality of discrete time periods 203. During the time periods 203, the station is redundantly and continuously transmitting the address of the station that it seeks to establish a communication link with. In the case of the example illustrated in FIG. 2, the preferred channel that was selected was 5 and the number 5 appears in the time periods 203. In the example illustrated in FIG. 2, station 100 would have chosen communication channel 5 because it was a communication channel that was available (not currently in use by other stations) and, of those channels that were available, it had the preferred link quality. During each time period 203 the transmission station 100 broadcasts redundantly the address of the station that it seeks to establish communication with. In the case of the example of FIG. 2 this would be station 200 of FIG. 1. Station 200 is in the scanning receive mode and is listening for its assigned address or, in the case of the preferred embodiment that will be discussed later, one of its assigned addresses. At time block 207, station 200 has sequenced from communication channel 1 to communication channel 5 at which block it detects and synchronizes on an address data signal and decodes its address. Upon recognizing its address, station 200 will stop the scanning process and remain on channel 5. Station 100 continues transmitting the called address redundantly on the preferred channel until it has completed the transmission of a prescribed number of time blocks. In the example in FIG. 2 there are 11 time block periods for redundantly transmitting the called station address. This is based on the assumption that the station 100 and station 200 of FIG. 1 have assigned 10 communication channels and that the two stations are scanning in an asynchronous manner with respect to each other. As a point of clarification, operation in an asynchronous mode means that station 200 could have been at any arbitrary point in a time block 205 and in its sequence through the ten channels of the example of FIG. 2 when the call transmission began from station 100. In this example then, the transmitting station would redundantly transmit the called address for eleven time periods. At the end of the transmission of the eleventh time period of the called or "To" address in blocks 203 the transmitting station will redundantly transmit its address in block 209. If, as in the example of FIG. 2, the receiving station 200 has established sync, detected its address, and stopped scanning, it will receive the caller's address from station 100 in time block 215. The station 200 then transmits the caller's address back to the caller during block 217 and also transmits its own address during time block 219. The calling station 100 in the example will receive its own address back during time block 211 and receive the called station's 200 address in time block 213. After the completion of time blocks 211, 217, 213 and 219 which, for point of accuracy, do not show the tune time for station 200 or the propagation delays, the receivers/transmitters or transceivers are turned over to the operators for transmitting normal voice or data between the two stations as the link has been established at that point in time as represented by line 225.

Figure 3:
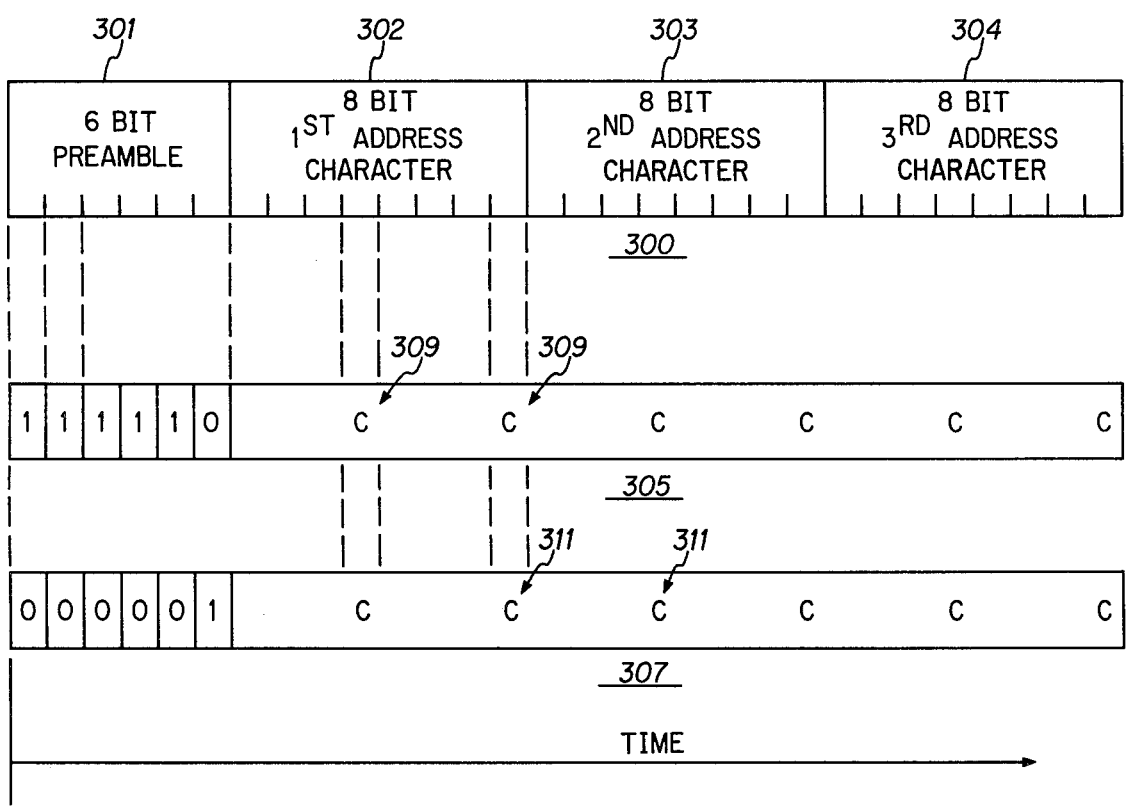
FIG. 3 is an illustration of the message formats according to the invention.

In FIG. 3, to which reference should now be made, there is illustrated a simplified diagram of a message format that is redundantly transmitted during each discrete time period 203 by station 100 of the example shown in FIGS. 1 and 2. That is, the message format for asynchronous operation is transmitted more than once and in the preferred embodiment the message format is transmitted five times during each time block. There is provided a preamble 301. In the case of the example this is a six bit preamble which is followed by three eight bit characters 302, 303 and 304. Each eight bit character is capable of being encoded with either an alpha or a numeric character to provide a three symbol alpha numeric address for each station. In the example shown in FIG. 3, format diagram 305 illustrates the situation where the calling station is transmitting a call "To" the station whose address is contained in format diagram 305. During the preamble period, the first five bits are all ones followed by a complement bit, zero, in the sixth bit time and then followed by the address of the station that the transmission is directed "To". To avoid duplicating the preamble bit pattern anywhere in the remaining data field of the eight bit characters 302, 303, and 304, each third bit is followed by its complement bit 309 which guarantees a bit transition at least at each forth bit and precludes the existence of five ones or five zeros in succession, thus protecting the uniqueness of the preamble. This would be the message format transmitted redundantly by the station 100 during time block 203 and station 200 during time block 217 of FIG. 2. The information redundantly transmitted during time blocks 209 and 219 is represented by format diagram 307 where the preamble 301 has a complement pattern of that of format diagram 305. This indicates that the transmission is being made "From" the station whose address is contained in format diagram 307. Again, as in the case of diagram 305 every third bit is followed by a complement bit 311 which is the complement of the preceding bit.

Figure 4:
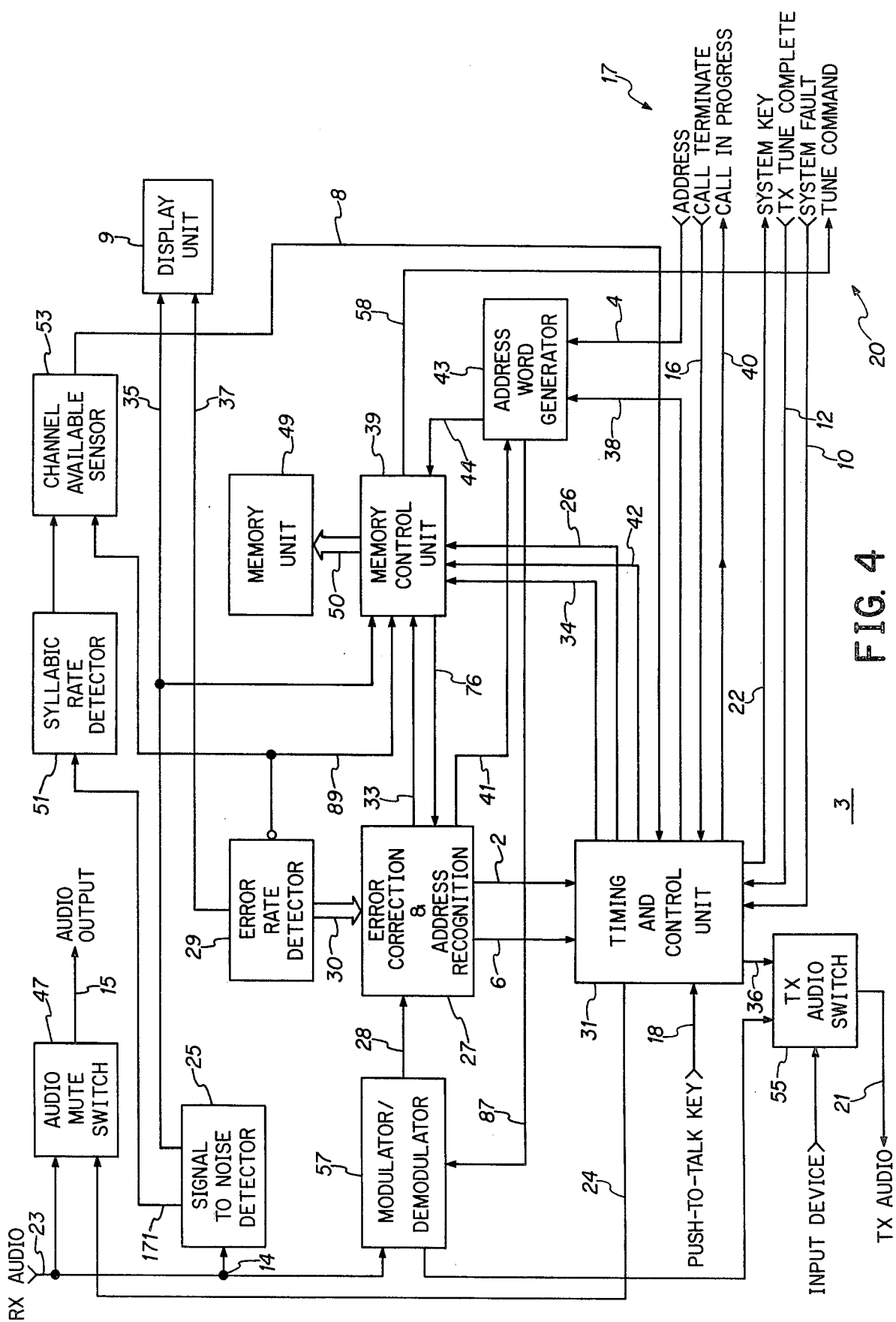
FIG. 4 is a block diagram of the Adaptive Communication Processor of FIG. 1.

FIGS. 2 and 3 should be used in combination with FIG. 4 which is a block diagram of the Adaptive Communications Processor 3 and to which reference should now be made. In the scanning receive mode, the station continues to sequentially monitor the communication channels for an address data message as shown in FIG. 2. The incoming signal is applied to the node point 14 and subsequently to the modulator/demodulator 57 and the signal to noise detector 25. Although the signal on conductor 23 has been received by the receiver/transmitter 1, it has been encoded with a modulated digital signal such as that illustrated in the example of FIG. 3. The modulated digital signal is demodulated by the modulator/demodulator 57 and applied to the error correction/address recognition unit 27. The error correction/address recognition unit 27 provides bit synchronization of the demodulated digital data with the local data clock; performs error correction on the demodulated digital data stream; decodes the address, preamble and preamble polarity; compares the decoded address with the appropriate stored addresses; and outputs appropriate system signals to the timing and control unit 31 and the memory device control unit 39. The number of errors that are detected is counted by the error rate detector 29 which is connected to the error correction/address recognition unit 27 by way of data bus 30.

Simultaneously while the data is being demodulated by the modulator/demodulator 57 the signal to noise factor on the communication channel is being measured by the signal to noise detector 25.

When the error correction/address recognition unit 27 has identified the address of the transmitting station and verified through comparison that the address is a valid address stored as a preset in a register within memory unit 49, at the completion of time block 215 of FIG. 3, a load command is generated and applied to the memory control unit 39 via conductor 33. The memory control unit upon the occurrence of the load command will load the signal to noise factor that was measured by the signal to noise detector 25 into the memory device 49 (if the error rate is below a selected level) according to the "From" address of the station that transmitted the message and the communication channel that the message was received on. In addition, as an option, the output of the signal to noise detector 25 and the error rate detector 29 may be displayed on the display unit 9 which is connected to the signal to noise detector 25 and the error rate detector 29 via conductors 35 and 37, respectively.

The timing and control unit 31 provides as the name of the unit implies all of the system control and timing signals and is responsive to input stimuli or signals from the several units and sub units that comprise the adaptive communication system.

The input signals consist of three categories, those originated by the operator, those originated by the receiver/transmitter 1 and those originated by the adaptive communication processor 3.

The operator has the capabilities of initiating and terminating calls. A call is initiated as in any two-way radio system by pressing the push to talk key. This signal is provided to the timing and control unit 31 via conductor 18. A call is terminated by the operator making the appropriate entry to the radio control unit 5 which forms the terminate signal to the timing and control unit by way of conductor 16 which is a member of the conductor bundle 17.

The transmitter, in response to a transmit tune command, provides a tune complete signal, via conductor 12 indicating when the transmitter section of the receiver/transmitter is tuned to the selected channel. In addition, if the receiver/transmitter 1 has, as in the preferred embodiment, a system fault indicator that provides for terminating a call, then a system fault signal is provided to the timing and control unit 31 via conductor 10 which is a member of conductor bundle 20 from the receiver/transmitter 1.

The timing and control unit also receives the following signals that are generated internally to Automatic Communication Processor 3:

Channel available signal from the channel available sensor 53 via conductor 8;

The "To" address recognition signal from the error correction/address recognition unit 25 via conductor 6; and The "From" address recognition signal from the error correction/address recognition unit 25 via conductor 2.

The timing and control unit provides the following output signals:

A system key signal which is the delayed push to talk key and is applied to the transmitter section of the receiver/transmitter 1 via conductor 22 which is a member of conductor bundle 20;

A mute control signal which controls the audio mute switch 47 and is applied to the audio mute switch 47 by way of conductor 24;

An automatic select control signal which controls the channel scanning and is provided to the memory control unit 39 via conductor 26;

A select alternate channel control signal to the memory control unit 39 via conductor 34;

A transmit audio control signal which controls the transmit audio switch 55 and is applied to the transmit audio switch 55 via conductor 36;

A message format control signal is applied to the address word generator 43 via conductor 38; and A call-in-progress control signal is applied to an optional indicating device on the radio control unit 5 via conductor 40 which is a member of the conductor bundle 17.

In general, as was discussed in conjunction with FIG. 2, when a station is not transmitting and receiving data it is monitoring a group of assigned channels by scanning sequentially the assigned channels and in the preferred embodiment the unit starts monitoring the lowest frequency channel first and sequences up through the higher frequencies. However, when the error correction and address recognition unit 27 detects a valid "To" address, then the timing and control unit 31 prevents the receiver/transmitter 1 from sequencing further and the radio stays on that channel until a prescribed period has expired after a last transmission on the prescribed channel or alternatively until the operator manually terminates a call via an input to the radio control unit. The audio mute is removed on the recognition of a "To" address at the end of time period 207 of FIG. 2 by the audio mute command from the timing and control unit 31. Then the audio mute switch 47 allows the receive audio to be passed through to the audio output device (not shown). During the period of time after the error correction and address recognition unit has detected the "To" address assigned to the receiving station followed by a "From" address from the calling station, the timing and control unit 31 initiates a response message via conductor 38 to the address word generator 43, conductor 36 to the Tx audio switch 55, and the system key conductor 22, to the receiver/transmitter 1. This occurs during time blocks 217 and 219 of FIG. 2. The address word generator 43 generates the address words that are to be transmitted in time blocks 217 and 219 of FIG. 2 in accordance with diagrams 305 and 307 of FIG. 3 respectively. This message is applied to the modulator/demodulator 57 for transmission by the receiver/transmitter 1 via conductor 21 and the Tx audio switch 55. At the completion of the transmission of the answer messages at time line 225 of FIG. 2, the link is established and the operator may proceed to use the radio in a normal manner.

When a station initiates a call, the operator enters the address of the station that he wishes to contact into the radio control unit. This entry may be done by keyboard which in the example of FIG. 3, would be a three character alpha numeric code for the address. The memory control unit 39 selects the channel with the preferred link quality from the memory device 49 by way of data link 50 and sends the channel information to the receiver/transmitter 1 which responds by immediately tuning the receiver portion of the receiver/transmitter to the frequency that corresponds to the preferred channel. Once channel information has been sent to the receiver/transmitter, the timing and control unit will allow the receiver/transmitter to remain in the receive mode for a time period to ascertain if the channel is available for communication. During this period of time the signal to noise detector provides an output to a syllabic rate detector 51 which detects if there are any voice type audio signals present. The syllabic rate detector 51 and the signal to noise detector 25 together form a device such as that disclosed in U.S. Pat. No. 3,102,236, for detecting the recurrence of energy pulses at a rate corresponding to the syllabic rate of human speech in the portion of the audio spectrum that corresponds to the frequencies encountered in human speech.

In addition, the error rate detector 29 is monitored to ascertain if there is any digital data being transmitted on the selected channel. The channel available sensor 53 compares the output from the syllabic rate detector 51 and the error rate detector 29 and if both outputs indicates that the channel is available (not in use) then the channel available signal will be provided to the timing and control unit 31 via conductor 8.

In the event that the channel is unavailable, then the timing and control unit 39 causes the memory control unit to select the channel with the second best link quality and the process is repeated until the first available channel is selected. After the available communication channel has been selected the timing and control unit 31 initiates a transmit tune cycle by keying the system key via conductor 22 of conductor bundle 20.

Upon completion of an automatic transmit tune cycle, the receiver/transmitter 1 sends a tune complete signal back to the timing and control unit 31 allowing it to advance to the address transmission portion of the call sequence. Address word generator 43 formats the "To" and "From" address words of FIG. 3 which comprise the data message which is transmitted as illustrated in FIG. 2 on the selected available channel. The "To" address is transmitted repeatedly and continuously for a period of time that is equal to the number of assigned channels plus one time periods 203. At the completion of this period of time, the "From" address is transmitted for one time period 209 as shown in FIG. 2. The station then returns to the receive mode and awaits a response.

In the event there is a response, the link quality of the channel on which the response was received is updated according to that channel number and the address of the station. After the completion of the transmission and receipt of messages discussed in conjunction with FIG. 2, i.e. time represented by line 225 of FIG. 2, the timing and control unit causes the Tx audio switch 55 to disconnect the modulator/demodulator 57 from the Tx audio line 21 and connect external transmit audio, voice or data from an input device (not shown), directly to the transmitter via Tx audio line 21 and also cause the operator's Push-To-Talk (PTT) key 18 to be passed directly to the receiver/transmitter as a system key via conductor bundle 20.

Figure 5:
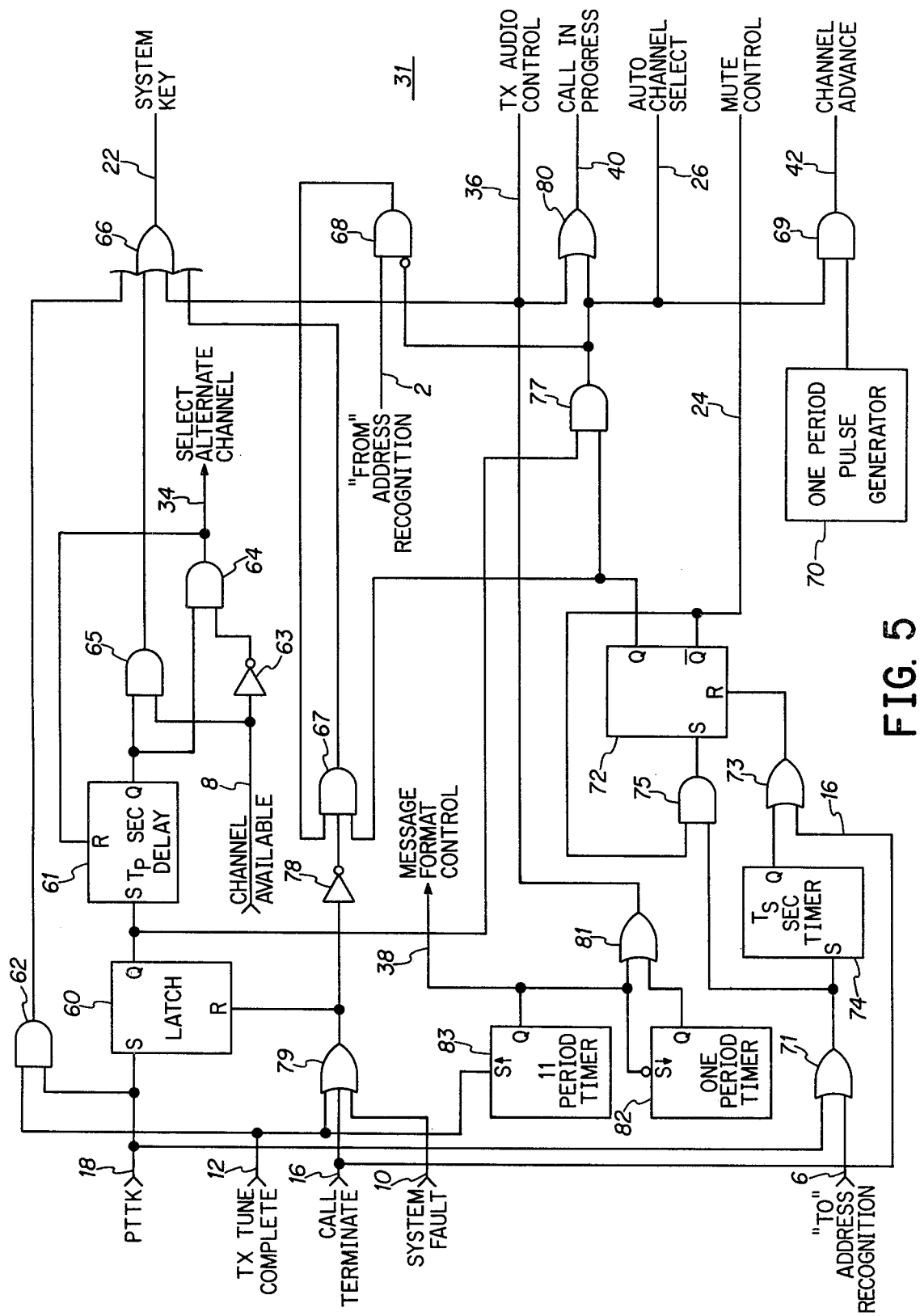
FIG. 5 is a logic diagram of the timing and control unit of the Adaptive Communication Processor of FIG. 4.

A logic diagram of the timing and control unit 31 is shown in FIG. 5, to which reference should not be made. As was discussed earlier, the timing and control unit provides the system key signal which in essence is a delayed push-to-talk key signal to the receiver/transmitter 1 via conductor 22. There are 4 conditions which will generate the system key signal as indicated at the OR gate 66. The first condition for the system key signal is when the push-to-talk key and a transmit tune complete signals are present simultaneously. The AND gate 62 ands the push-to-talk key signal with the tune complete signal to form one of the inputs to the OR gate 66. The second condition for system key is when the Tx audio switch 55 of the adaptive communication processor of FIG. 4 is enabled by the Tx audio control signal that is present on conductor 36. This signal is the ORed combination of the two timing devices, the eleven period timer 83 and the one period timer 82. A period is defined as a time block 203 of FIG. 2. The output of the eleven period timer 83 is the message format control that is provided on conductor 38 and applied to the address word generator of FIG. 4. OR gate 81 ORS the message format control signal with the output of the one period timer 82 to provide the Tx audio control signal that is present on conductor 36 and applied to the Tx audio switch 55 as well as to the OR gate 66 to provide the system key signal on conductor 22 that is applied to the receiver/transmitter 1. As will be discussed later, the third case is when there is a logical one on the output of gate 65 which results from the enabling of the push-to-talk key. The fourth case where a system key signal is generated on conductor 22 is the case when a transmit tune cycle is initiated in response to an incoming call. This function includes the combination by gate 67 of the NOR function that is provided by the combination of the OR gate 79 and the inverter 78 to the Tx tune complete signal that is present on conductor 12, the call terminate signal that is present on conductor 16 and the system fault signal that is present on conductor 10. If none of these functions are present, then there will be a positive signal on one of the input terminals of the AND gate 67.

The stop scan condition is derived from the Q output of the RS flip-flop 72 and is the complement of the mute control signal that is present on conductor 24. The Q output of RS flip-flop 72 is enabled whenever there has been a push to talk input within the last $T_S$ time period which in the case of the preferred embodiment is 30 seconds. The third input to the AND gate 67 is the output of AND gate 68 which combines the signal indicating a "From" address has been recognized by the error correction address recognition unit 29 of FIG. 4 with the complement of the automatic channel select control line which is the output of the AND gate 77. These conditions indicate that the unit has not entered the automatic channel select mode and that there has been a "From" address recognition. Implied from this is that a "To" address recognition has been received prior to the "From" address recognition since an input to the OR gate 71 served as the input signal to cause RS flip-flop 72 to be set.

The mute control signal that is provided by the timing and control unit 31 on conductor 24 is derived from the same RS flip-flop 72 that provided the stop scan command only the mute control signal is a complement or provided on the Q not output of the RS flip-flop 72. A positive signal on the Q output of flip-flop 72 indicates that scanning has stopped as a result of a recognition of the "To" address by the error correction address recognition unit 27 or as a result of a push-to-talk key action from the local operator. The automatic channel select output signal is derived from AND gate 77 and is dependent on an input signal from the RS flip-flop 72 indicating that scanning has stopped, and from the push-to-talk latch 60 which indicates that the action was initiated locally rather than in response to an incoming call.

The call in progress signal is an OR function provided by OR gate 80 of the TX audio control signal and the automatic channel select signal which indicate that the system is in the process of either selecting a channel or transmitting the address data information.

In the situation where no push-to-talk action has been recognized within the $T_S$ second time limit of the $T_S$ second timer 74, RS flip-flop 72 will reset and the stop scanning signal will be disabled allowing scanning to resume. The mute control line is used as an input to gate 69 which then gates a one period pulse from the one period pulse generator 70 to the channel advance generator of the memory control unit to select the next channel and thus effects scanning of the stored preset frequencies on a one period per channel basis.

When a call is initiated by the local operator by enabling a push-to-talk key signal, the Q output of the latch 60 enables the $T_P$ delay gate 61 which in the case of the preferred embodiment is a one second delay and provides an output signal to the AND gate 64 for combining with the signal from the inverter 63 which is the complement of the channel available signal coming from the channel available sensor unit 53. If after the $T_P$ delay of timing delay 61 has passed and the output signal from the channel selector indicates that the channel is not available, a select alternate channel signal will be enabled which will toggle the sequence in the memory control unit 39 of FIG. 4 to select an alternate channel and at the same time reset the $T_P$ delay timer 61 to allow another $T_P$ period of channel evaluation to take place on the alternate channel. This process repeats until an available channel is obtained at which time the time delay 61 does not result in the proper input signals to select an alternate channel and the output of the AND gate 65 does provide a momentary system key to initiate the automatic transmit tune cycle on the frequency that corresponds to the available channel.

The Tx audio control signal is derived from a combination of two timers, as was discussed earlier, 83 and 82, which are activated by the completion of a transmit tune cycle which sets the eleven period timer 83. At the end of the eleven periods, when timer 83 turns off, timer 82 is then set by the action of timer 83 turning off and runs for an additional one period. The times of these two timers are combined by OR gate 81 to provide the transmit audio control output which is an input signal to the system key OR gate 66 and the call in progress OR gate 80. The output of the timer 83 is also the message format control line used as an input signal to the address word generator 43 of FIG. 4. This signal selects the "To" message format for the first eleven periods of the transmissions and the "From" message format for the remaining one period of the sequence.

Figure 8:
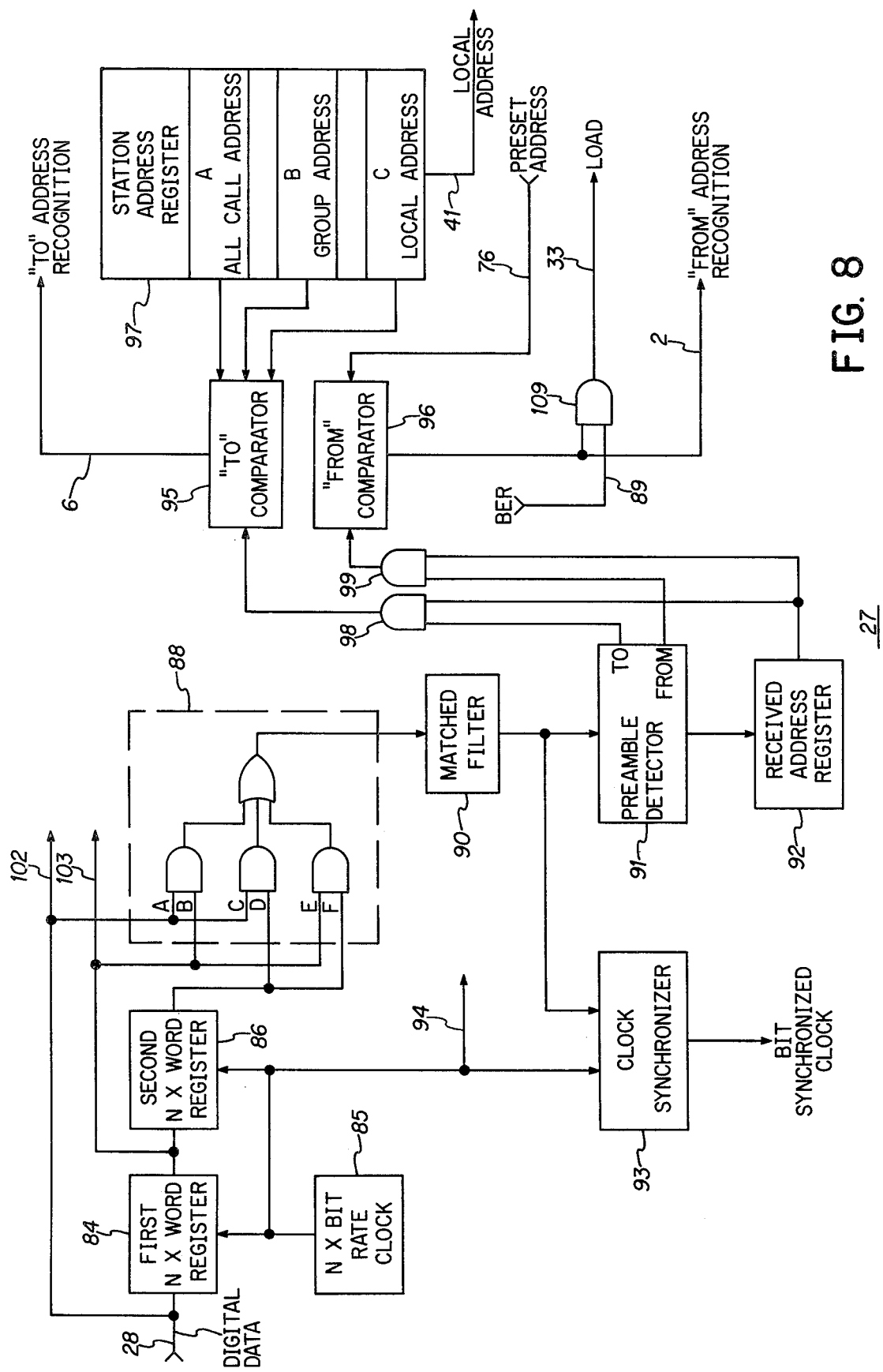
FIG. 8 is a block diagram of the error correction/address recognition unit of the Adaptive Communication Processor of FIG. 4.

The error correction and address recognition unit 27 of FIG. 4 is illustrated in FIG. 8. The output of the modulator/demodulator 57 is applied via conductor 28 to the error correction and address recognition unit 27. In the preferred embodiment, bit synchronization is accomplished in the asynchronous mode by using bit correlation techniques and a high speed local clock operating at some interger N times the received data bit rate. The demodulated data is closed into the first N×word register 84 by the N×bit rate clock 85. In the preferred embodiment N is equal to 8. The first word registers hold N times the number of bits associated with each data word. In the preferred embodiment as illustrated in FIG. 3, there are 30 bits per word and the first N×word register is N times 30 bits so if N is 8 as in the preferred embodiment then the first register 84 would hold 240 sub-bits of data. In series with the first N×word register is the second N×word register 86 which again will hold N times the number of bits per word. As the demodulated data is shifted through the first N×word register and second N×word register by the N×bit rate clock 85, the input to the first N×word register is applied to the AND/OR device 88 at terminals A and C via conductor 102. The output of the first N×word register 84 is applied via conductor 103 to terminals B and D of the AND/OR device 88 and the output of the second N×word register 86 is applied to terminals D and F of the AND/OR device 88. The AND/OR device 88 performs a voting on the bits and will provide an output bit that is of the state of at least two of the three sample points which are the input of the first N×word register 84, the input of the second N×word register 86, and the output of the second N×word register 86. This best two out of three voting provides on the output of the AND/OR device 88, an error corrected bit stream at N times the received bit rate. This output signal is applied through the matched filter 90 which integrates the N×bit rate data and outputs corrected data at the original received data rate to the preamble detector 91 and the received address register 92 and to the divide by N clock synchronizer 93. A synchronized bit rate clock is derived by the clock synchronizer unit 93 by dividing the N×bit rate clock's output by N and phase locking the divider to the data output transitions from the matched filter 90. The synchronized bit rate clock is provided to the remainder of the circuits.

The preamble detector 91, of course, detects the preamble 301 of FIG. 3 and also detects its polarity. This is to say, whether it is of the "To" type of polarity represented by illustration format diagram 305 of FIG. 3 or a "From" type polarity represented by illustration format diagram 307 of FIG. 3. The received address register 92 stores the three eight bit address characters 302, 303 and 304 of FIG. 3 for comparison by the "To" and "From" comparators 95 and 96. Each station, in the preferred embodiment, has three "To" addresses associated with it, an All Call Address which is shared by all the stations with the common group of channels, a Group Address which provides for an address to be shared by a particular sub group of stations with the common group of channels and a local address which is the unique address of a particular station with the common group of channels. Each of the three addresses is stored in station address register 97 with the All Call Address stored in subregister A, the Group Address stored in subregister B and the local address stored in subregister C of the station address register 97.

The preamble detector 91 detects the preamble portion 301 of the word format diagram 300 providing word synchronization and address "To" or "From" information per FIG. 3 illustrated format diagram 305 or 307 respectively. Reception of a "To" address results in an enable signal being applied to address gate 98. The address gate 98 then allows the "To" comparator 95 to compare the address that has been stored in received address register 92 with the addresses stored in the station address register 97. When the "To" comparator 95 has compared the addresses stored in received address register 92 with the three addresses stored in station address register 97 and there is a comparison, a "To" address recognition signal is provided on the output of "To" comparator 95 to the timing and control unit via conductor 6. The timing and control unit upon receipt of the "To" address recognition signal stops the receiver from scanning the assigned channels and disables the receive audio mute via conductor 24 to the audio mute switch 47.

If the preamble detector detects a "From" preamble as represented by illustration format 307 of FIG. 3, then a signal indicating that the address that is stored in received address register 92 is the address of the station transmitting the message is applied to "From" address gate 99. "From" address gate 99 then allows comparator 96 to compare the address stored in the received address register with the preset addresses stored in the memory device 49 via memory control unit 39 and conductor 76. If there is a comparison between the received "From" address and one of the present addresses, a recognition signal is applied to AND gate 109 along with the output signal from the Error rate detector. The AND gate 109 will provide a load command if the bit error rate as indicated on line 89 is less than a pre-established threshold. This threshold is selected and permanently stored in the threshold detector of the error rate detector.

Figure 9:
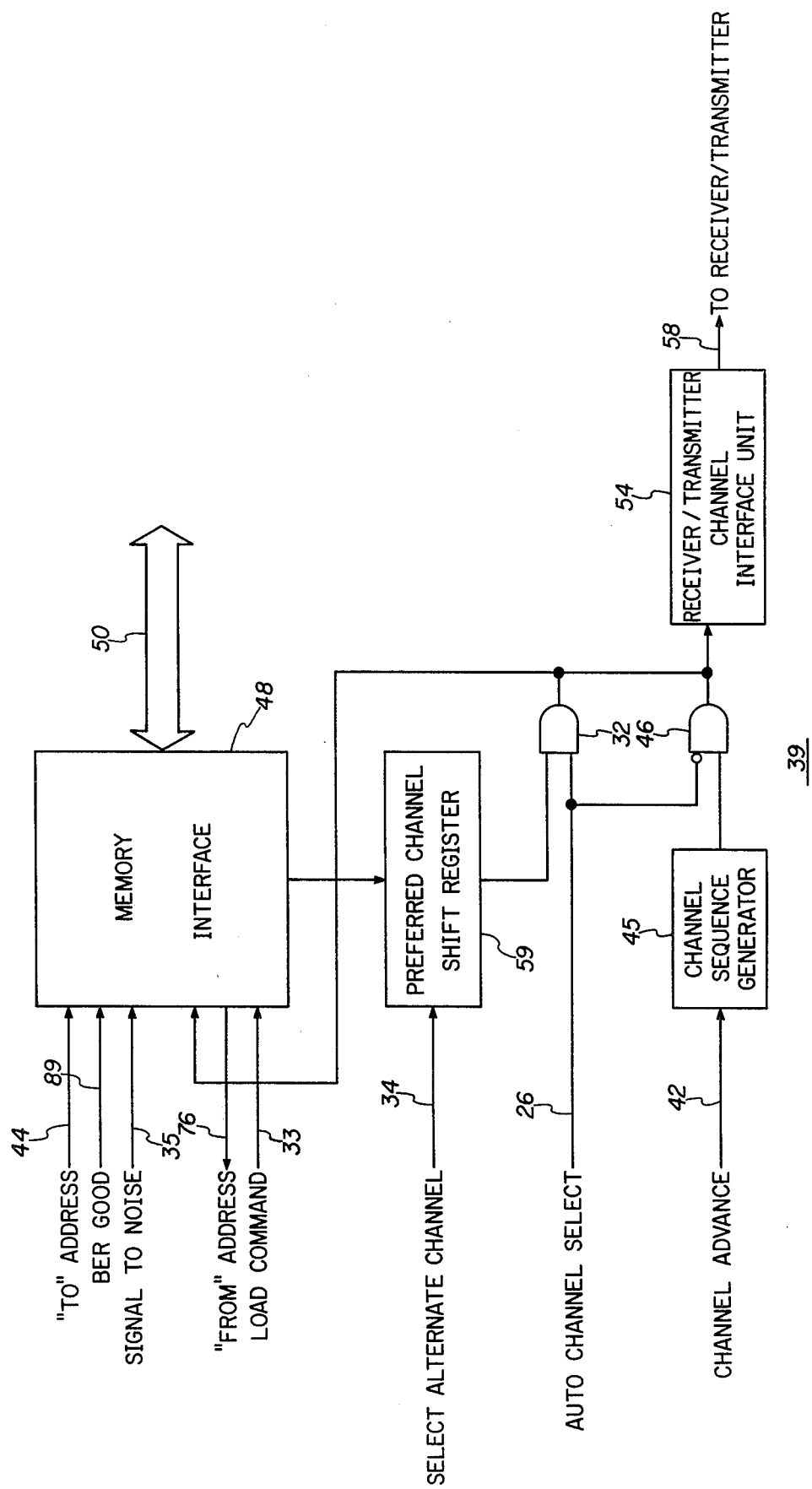
FIG. 9 is a block diagram of the memory control unit of the Adaptive Communication Processor of FIG. 4.

The memory control unit 39 is illustrated in FIG. 9 to which reference should now be made. In the preferred embodiment the functions illustrated in FIG. 9 as well as many portions of FIG. 4 could readily be implemented by one skilled in the art by use of microprocessor technology. Initially when the station is in the scanning receive mode, a channel advance command is provided from the timing and control unit 31 via data line 42 to the channel sequence generator. The channel sequence generator 45 is a ring counter whose output is a signal representing a channel number. In the preferred embodiment where ten preset channels are used, the output will be a repetitive sequence of numbers from 1 to 10 with the sequence progressing in an ascending order. Each time a channel advance command is received, the channel sequence generator will advance the channel number by one increment. The output of the channel sequence generator 45 (the tune command) is sent to the receiver/transmitter 1 via conductor 58 of conductor bundle 20, gate 30 and the receiver/transmitter channel interface unit 54 when in the scanning receive mode. In the preferred embodiment, the timing and control unit allows 0.5 second between channel advance commands thus causing the receiver portion of the receiver/transmitter 1 to scan the ten preset channels at the rate of two channels per second. Scanning can be stopped by either recognition of a valid "To" address as recognized by the error correction and address recognition unit 27, in which case channel advance commands cease and the receiver/transmitter remains on the channel on which the "To" address was received, or by initiating a call to another station, in which case the operator selects the desired stored address and applies a (push-to-talk) PTT key which causes the following sequence of events to occur:

The timing and control unit 31 detects a PTT key while in the scanning receive mode and, interpreting that this station is initiating a call as opposed to responding to a call, provides an Auto Channel Select command via line 26 to the memory control unit 39.

The memory interface unit 48 extracts the preferred channel order from memory, according to the operator selected "To" address and stores this information in a preferred channel shift register 59 which will be discussed further in conjunction with FIG. 10.

Gates 32 and 46 select which source of channel information will be sent to the receiver/transmitter by interface unit 54, and in this case, as controlled by the Auto Channel Select signal on conductor 26, the first entry in the Preferred Channel Shift Register 59 representing the channel with the highest link quality is provided to the receiver/transmitter channel interface unit 54 via gate 32.

If the first preferred channel is not available for the call, an alternate channel is selected by incrementing the preferred channel shift register 59 one step in response to a Select Alternate Channel command from the timing and control unit 31 via conductor 34. If the first alternate channel selected is not available, the process is repeated until an available channel is selected.

It should be noted that when initiating a call, the preset address stored in memory represent the list of "To" addresses from which the operator may choose, and subsequently the chosen address is the "To" address applied to Memory Interface unit 48 for the purpose of recalling from memory unit 49 the preferred order of channel numbers as determined by the link quality factors stored for each channel with respect to the selected "To" address. This contrasts with the condition where a link quality update is loaded into memory device 49 as a result of receiving a "From" address message in which case the preset addresses are considered "From" addresses which are applied to the memory interface unit 48 for the purpose of loading updated link quality into memory unit 49.

Figure 10:
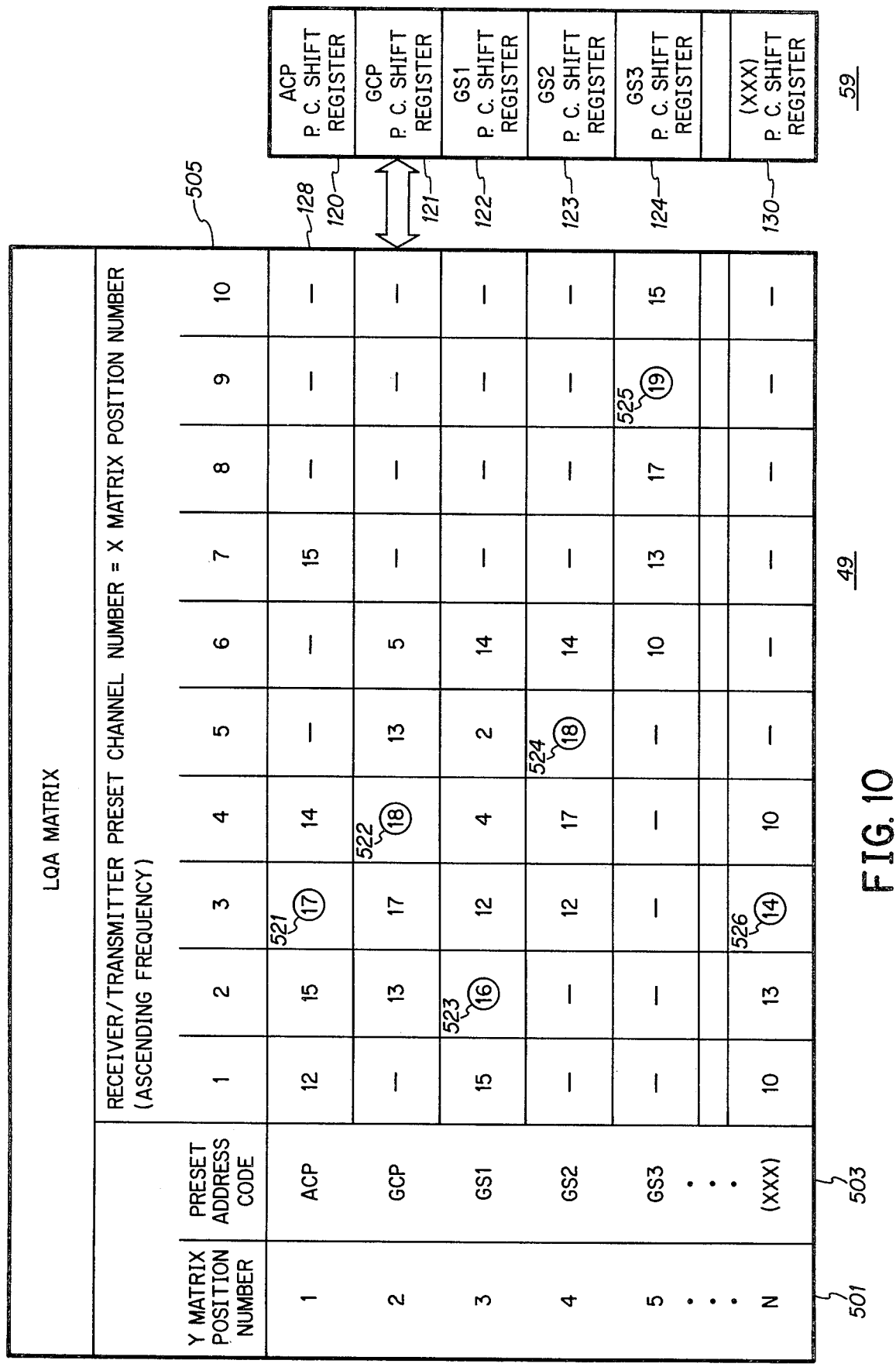
FIG. 10 is a layout of the memory unit of the Adaptive Communication Processor.

In FIG. 10 there is shown a layout of the memory unit 49 and the preferred channel shift register 59. The memory device consists of an x-y matrix known as the link quality analysis (LQA) matrix 49. Column 501 lists the "y" matrix position numbers that correspond to the address codes that are listed in column 503. The channel Nos. 505 represent the "x" matrix position numbers and correspond to the ten communication channels in the example. In the address column 503 there are listed preset address codes for the position numbers 1 through N. As seen from the figure of the memory unit 49, for the station that has the preset address code ACP, channel 3 has the best link quality. The 17 which is used for illustration purposes only is the relative signal to noise factor. The preferred communication channel for each address is indicated by rings 521 through 526 around the link quality factors.

Figure 11:
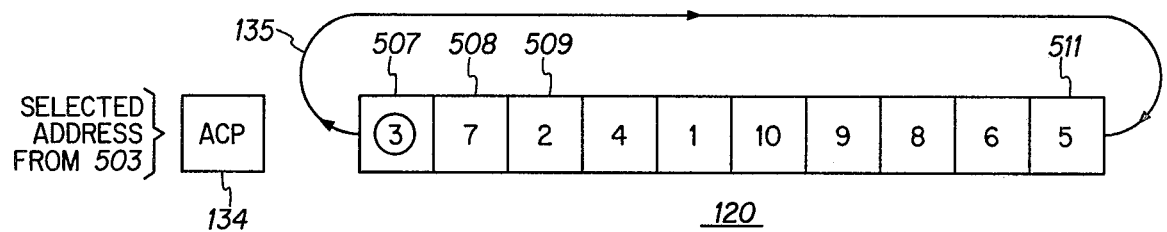
FIG. 11 is a layout of a preferred channel shift register of the memory unit of FIG. 10.

Referring to FIG. 11 which shows one preferred channel shift register 120 that is assigned the address "ACP", position 507 is the most preferred channel number with position 508 being the next best, position 509 being the next best and so on with position 511 being the least preferred communication channel. The channel sequence shown in Preferred Channel Shift Register 59 corresponds to the link quality preferred order of the channels according to information stored in the link quality matrix 49 in row 128 of FIG. 10. It should be noted that row 128 does not show link quality entries for all channel numbers and thus the preferred embodiment will automatically assign priorities to these channels in a numerically descending order following those channels which do have a stored link quality factor. Thus all assigned channels will always appear in the preferred channel shift register 59. Also shown in row 128 is a situation where more than one channel has the same link quality. The preferred embodiment will again automatically give higher priority to the higher channel number thus channel 7 will be entered in position 508 and channel 2 in position 509 of the preferred channel shift register 120.

The channel number stored in position 507 is provided to gate 32 of FIG. 9 and on to the receiver/transmitter via interface unit 54 if gate 32 is enabled by the auto channel select command on conductor 26. When one of the channels, as was discussd in conjunction with FIG. 4, is unavailable then the second best channel is selected by a select alternate channel pulse on conductor 34 from the timing and control unit 31 which causes the preferred channel shift register to increment one step in the direction shown in FIG. 11 moving the second best link quality channel number from register position 508 to 507. After a channel is tried, it is shifted to the least preferred channel position 511 as indicated by line 135. Similarly each address has its own preferred shift register, 120 through 121 and 130.

Figure 6:
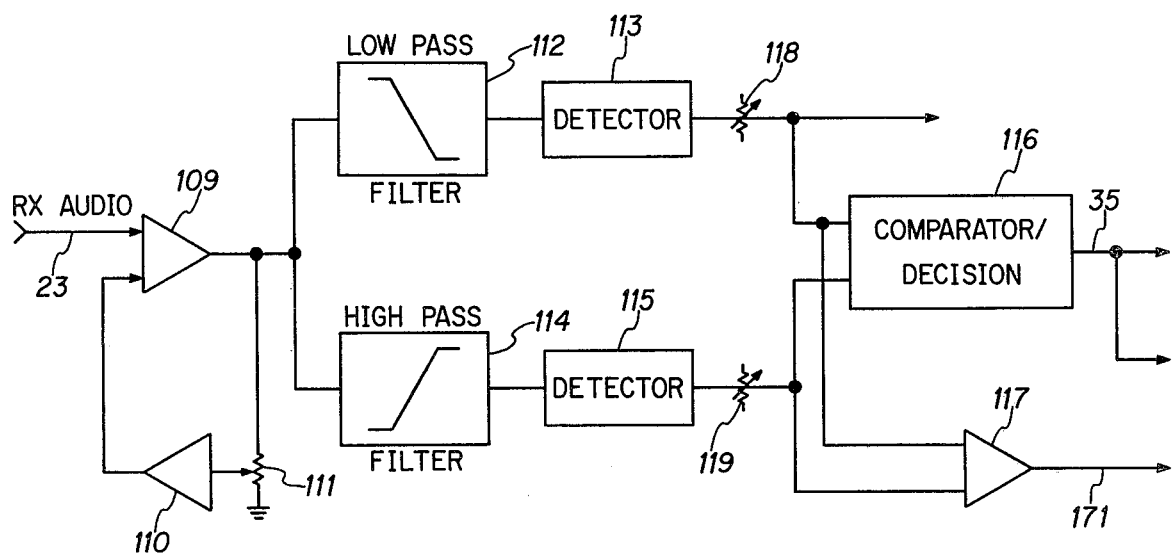
FIG. 6 is a circuit diagram of the signal to noise detector of the Adaptive Communication Processor of FIG. 4.

One embodiment of the signal to noise detector 25 is illustrated in FIG. 6 where the received audio signal is applied to a buffer amplifier 109. In the preferred embodiment, it is desirable to have an automatic gain control associated with the circuit and this function is implemented by amplifier 110 and adjustable resistor 111 which are arranged in a feedback loop around the amplifier 109. There are two branches to the signal to noise detector, a low frequency branch and a high frequency branch. The low frequency branch consists of a low pass filter 112 designed to pass only the low frequency portion of the audio pass band signals that are predominently associated with human voice characteristics, followed by detector 113 that detects the energy level of the filtered signal.

The high frequency branch consists of a high pass filter 114 that passes that portion of the audio pass band which is generally above the major high energy frequencies normally associated with human voice, followed by detector 115 for detecting the signals energy level. The DC output of the two detectors 113 and 115 are applied to the comparator/decision unit 116 and comparator 117. Under ideal conditions where there is an absence of signal, equal noise energy is passed by both the high pass and low pass filters resulting in equal DC voltages being supplied to comparators 116 and 117. In the presence of a voice signal, the low pass branch will pass a larger signal than the high pass branch causing the output of detector 113 to exceed that of detector 115 thus indicating the presence of a predominantly low frequency signal. The ratio of the outputs from detectors 113 and 115 is an indication of the relative signal to noise ratio of the received signal. Comparator 117 provides an analog output signal, whose amplitude is proportional to the low frequency content of the received signal, to the syllabic rate detector 51 of FIG. 4. The output of comparator/decision unit 116 is a digital signal that is applied to the memory control unit and the optional display unit.

Figure 7:
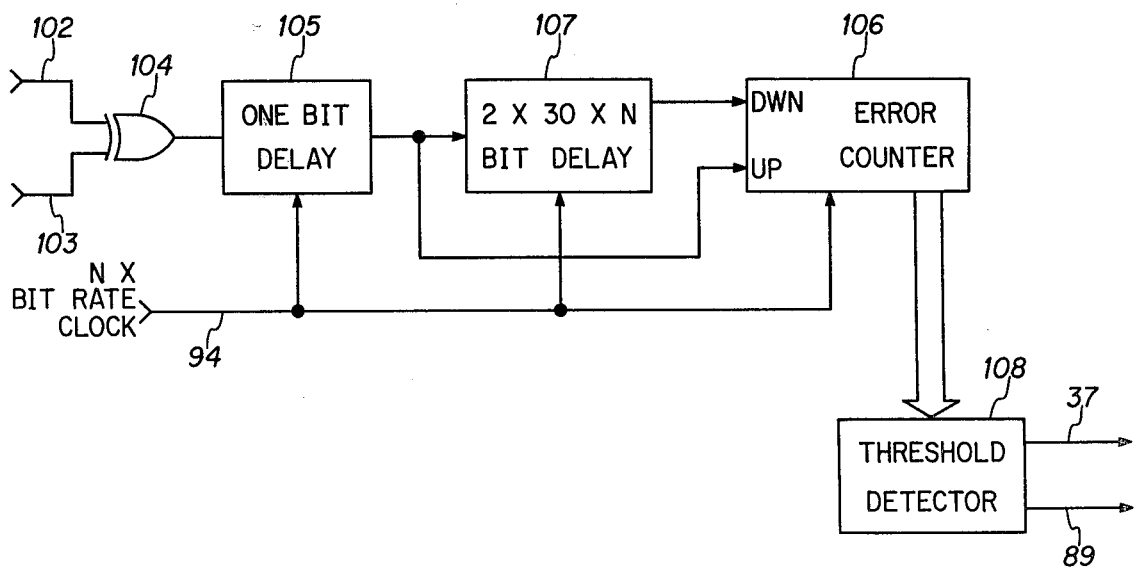
FIG. 7 is a circuit diagram of the bit error rate detector of the Adaptive Communication Processor of FIG. 4.

The error rate detector 29 (shown in FIG. 7) includes an exclusive OR gate 104 which compares the sample points that are connected by conductors 102 and 103 of conductor bundle 30 to the error correction and address recognition unit 27. The output of the exclusive OR is applied to one-bit delay register 105. The one-bit delay register 105 prevents the error counter 106 from counting noise spikes and voltage transients as errors. Error counter 106 is an up-down type counter with total capacity of at least $2 \times 30 \times N$ bits. The output of one-bit delay register 105 goes to the "up" input of error counter 106 and to a $2 \times 30 \times N$ bit delay register 107. The output of $2 \times 30 \times N$ bit delay register 107 is applied to the "down" input of error counter 106. The one-bit delay register 105, $2 \times 30 \times N$ bit delay register 107 and error counter 106 are all clocked by the $N \times$ bit rate clock output from the $N \times$ bit rate clock 85 of FIG. 8. Simultaneous inputs on both the "up" and "down" input lines to error counter 106 will result in no change to the counter content. In the case of the preferred embodiment where N equals 8, $2 \times 30 \times N$ bit delay will provide a 480 bit delay, thus the output of error counter 106 will be the error count within the last 480 bits received. Threshold detector 108 will compare the output of error counter 106 with a predetermined threshold level and output via conductor 89 to the memory control unit 39 to enable the load signal if the error rate is below the acceptable threshold of threshold detector gate 108.

The channel available sensor 53 is connected to the error rate detector via conductor 89 and is used to indicate to the channel available sensor 53 the absence of significant bit errors and consequently the presence of data which also indicates that the channel is in use.

It is assumed but not shown that the delay registers 105 and 107 and the error counter 106 are initially set to 0 at the beginning of system operation. Alternatively, such a mechanism could be implemented from the channel advance command signal from the timing and control unit 31. In this case delay registers 105, 107 and error counter 106 would be set to 0 each time the receiver/transmitter was advanced to a new channel while in the scanning receive mode.

Figure 12:
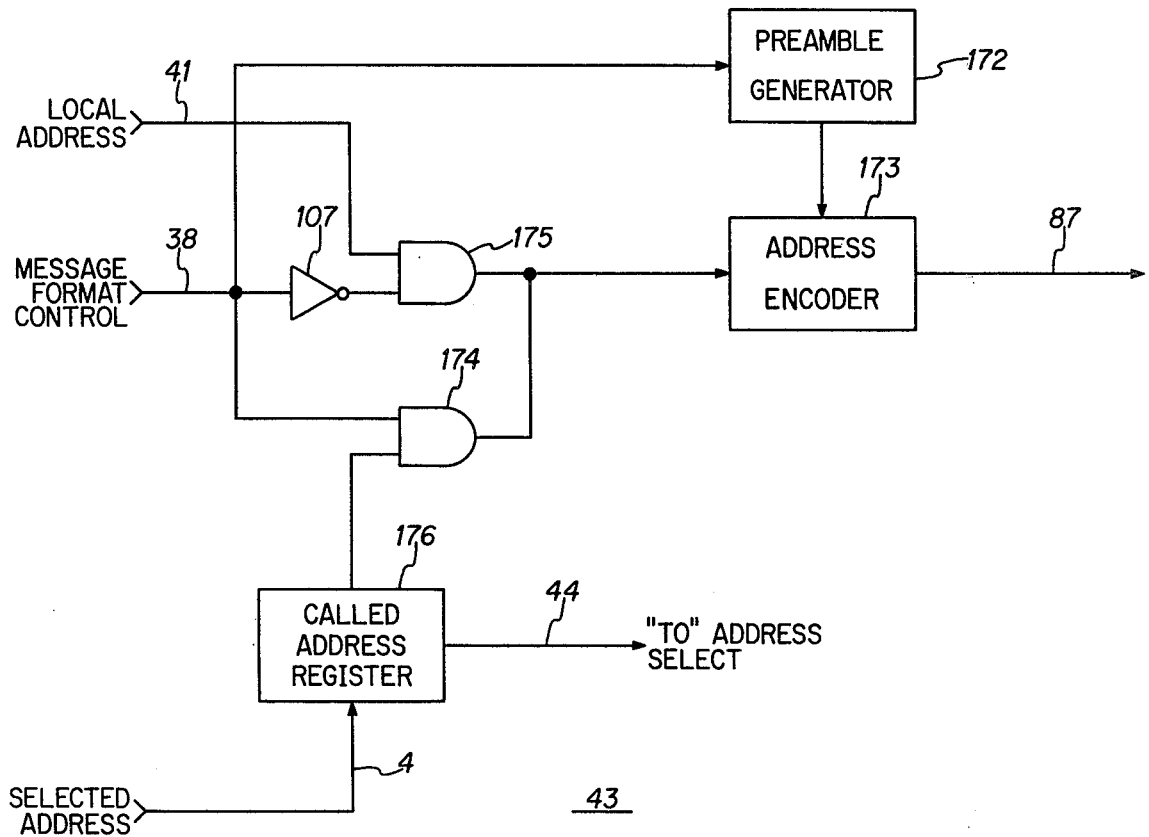
FIG. 12 is a block diagram of the address word generator of the Adaptive Communication Processor of FIG. 4.

The address word generator 43 is illustrated in FIG. 12 to which reference should now be made. When a call is initiated, the address selected by the operator from the radio control is stored in the called address register 176 which, as discussed earlier with reference to FIG. 9, causes the preferred channel to be selected and the transmitter tuned to that channel. Address encoder 173 constructs the address data word in the proper format according to FIG. 3, 305, or 307 depending on the polarity of the preamble supplied by preamble generator 172, and the address characters supplied by selector gates 175 and 174. The message format control line 38 from the timing and control unit 31 determines which set of address characters are used. For the first 5½ seconds, 203 of the sequence 101 in FIG. 2 for the 10 channel example of the preferred embodiment, the message format control line 38 will enable gate 174 and signal the preamble generator 172 to supply a "To" preamble to the address encoder 173. The necessary complement bits 309 in FIG. 3 are added by the encoder and the completed "To" address 305 is applied via line 87 to the modulator/demodulator 57. For the next ½ second period 209 of FIG. 2, the message format control line 38 will enble gate 175 and signal the preamble generator 172 to supply a "From" preamble to the address encoder 173. The local station address 97C in FIG. 8 is then applied via line 41 and gate 175 to address encoder 173, where the appropriate "From" address 307 is constructed and applied to the modulator/demodulator 57. As a point of clarification, the above mentioned response sequence to a call received occurs automatically only if the "To" address recognized was the local station address stored in address register 97C. Although not shown, the desired response to a received All Call (97A) or Group Call (98B) would be to halt the timing and control sequence at the point where receive scanning has been halted and the audio mute has been disabled allowing the operator to listen. A further desirable feature would be for the automatic answer to continue on receipt of an operator PTT key. Thus no transmission will be made from the receiving station unless initiated by the operator.

Many functions of the adaptive communication processor 3, as was discussed earlier, may be implemented by microprocessor techniques.

In conclusion, it is evidenced from the reading of the above described specification that the described preferred embodiment of the invention will enable the establishing of a communication channel between at least two stations on an automatically selected preferred channel. The stations when not in transmit are continually sequencing through the assigned list of channels stopping at each channel and monitoring that frequency associated with the channel for a predetermined period of time. When the station receives a message on that channel it measures the link quality of the assigned channel which includes two factors, a signal to noise factor and a bit error rate factor. When transmission is initiated by a station, it will automatically select the best channel that is available based upon the link quality analysis factor that is stored.

Many modifications in the above-described embodiments of the invention can, of course, be carried out without departing from the spirit and scope of the invention. Accordingly, the invention is intended to be circumscribed only by the scope of the appended claims.

We claim:

1. A high frequency (HF) communication system with at least two stations and wherein each station has a discrete address, a transmitter, a receiver, a radio control unit for controlling the operation of the transmitter, the receiver and to receive a discrete address of a station that is to be called and an adaptive communication processor means for selecting the preferred frequency for transmitting at least a preselected message format between the stations and wherein the adaptive communication processor means, comprises:

PTTK means for placing the station in a transmit mode;

timing and control means for sequentially tuning the receiver through a group of N channels when the station is not in the transmit mode and where N is the number of alternate communication channels with each channel having a preselected frequency and bandwidth, the timing and control means causes the receiver at each channel to listen for the discrete address for a preselected period of time;

link quality means for measuring a link quality of each channel that the receiver is tuned to including, signal-to-noise detector means for obtaining a signal-to-noise factor-error rate detector means for obtaining a bit error factor for each channel-and combining means for combining the signal-to-noise factor and the bit error factor to obtain the link quality of each channel that the receiver is tuned to;

address detection means for detecting the discrete address of the station that transmitted a message on the channel to which the receiver is tuned;

storage means for storing the link quality of each channel by detected discrete address; and channel selector means for selecting the channel with the best link quality for the discrete address when the station is placed in the transmit mode.

2. The high frequency (HF) communication system according to claim 1 wherein the signal-to-noise detector means comprises:

noise detector means for providing a first DC signal representative of the noise that is present on the communication channel that the receiver is tuned to;

data detector means for providing a second DC signal representative of the data that is present on the communication channel that the receiver is tuned to;

means for combining the first DC signal with the second DC signal to obtain a third DC signal; and means for converting the third DC signal to a fourth signal representative of the third DC signal and acceptable by the storage means.

3. The high frequency (HF) communication system according to claim 1 wherein the message format is of at least three identical message words and wherein the error rate detector means comprises:

demodulator means for demodulating a received signal to obtain a demodulated digital signal of the message format;

first shift register means in series with the demodulator means for storing at least a bit word length of data where the bit word length is the number of bits contained in a single message word and for obtaining a first delayed demodulated digital signal;

second shift register means for storing a bit word length in series with the first shift register means and for obtaining a second delayed demodulated digital signal;

first circuit means for combining the demodulated digital signal with the first delayed demodulated signal and the second delayed digital signal;

means for generating an error signal whenever any one of the signals is different from the other two signals; and counter means for counting the number of times the error signal is generated.

4. The high frequency communication system according to claim 3 further includes a sync means for synchronizing the receiver with the message format, the sync means comprises:

means for storing the demodulated digital signal into the first shift register means and the second register means at a data rate of N times the bit rate of the demodulated digital signal where N is any number greater than one.

5. The high frequency communication system according to claim 1 further includes an error correction means that comprises:

stating voting means for comparing the demodulated digital signal with the first delayed demodulated digital signal and the second delayed demodulated digital signal; and means for providing an output of a digital state that corresponds to at least the states of two of the compared signals.

6. The high frequency (HF) communication system according to claim 1 wherein the storage means, comprises:

load command means for generating a load signal whenever the discrete address is detected;

a memory device whose access is arranged according to communication channel and address of the station transmitting the receive message; and means for loading the link quality into the memory device at the address and channel number.

7. The high frequency (HF) communication system according to claim 6 wherein load command means comprises:

preamble polarity detector means for detecting if the received message is being transmitted by a remote station or the receiving station;

address corresponds to the address assigned to the memory device; and second combining means for combining the output of the preamble polarity detector means and the address verification means, the combination of which being a load command signal.

8. The high frequency (HF) communication system according to claim 6 further comprising:

channel comparitor means for comparing the value of the link quality stored in the memory device for each channel and a discrete address; and priority storage means connected to the channel comparison means for storing in sequence from the highest link quality to the lowest link quality the channel that has the preferred link qualities according to the station address.

9. The high frequency (HF) communication system according to claim 1 wherein channel selector means comprises:

comparison means for comparing the link quality stored in the storage means of each channel according to the discrete address of the station;

priority register means connected to the comparison means for arranging under each discrete address the communication channels with the highest link qualities through the lowest link qualities in an order of the highest link quality first and the lowest link quality last; and retrieving means for retrieving the channel number having the highest link quality from the priority storage means.

10. The high frequency (HF) communication system according to claim 9 further comprising:

a channel available detection means for detecting if the channel with the highest priority is available for transmission.

11. The high frequency (HF) communication system according to claim 10 wherein the channel available detector means comprises:

means for measuring the noise level on the selected channel;

means for measuring the data on the selected channel;

syllabic rate detector means connected to the means for measuring the noise and the means for detecting the data for detecting if there is a syllabic rate present on the selected channel;

bit error rate detector means for detecting if there are data bits present on the selected communication channels; and means for combining the output of the syllabic rate detector with the bit error rate detector to provide a channel available signal.

12. A method of providing high frequency (HF) communications between at least two stations and wherein each station has a discrete address, a transmitter, a receiver, including a method for selecting the preferred frequency, comprises:

sequentially tuning the receiver through a group of N channels where N is the number of alternate communication channels with each channel having a preselected frequency and bandwidth;

detecting the discrete address of the station that transmitted a message on the channel to which the receiver is tuned;

measuring the link quality of each channel including the steps of; obtaining a signal-to-noise factor-obtaining a bit error rate factor and combining the signal-to-noise factor with the bit error rate factor to obtain the link quality of the communication channel that the receiver is tuned to;

storing the link quality of each channel by discrete address; and selecting the channel with the best link quality when a transmission is initiated to an addressed remote station.

* * * * *

UNITED STATES PATENT AND TRADEMARK OFFICE
CERTIFICATE OF CORRECTION

PATENT NO. : 4,328,581
DATED : May 4, 1982
INVENTOR(S) : James V. Harmon & Roger A. Kyllo It is certified that error appears in the above-identified patent and that said Letters Patent are hereby corrected as shown below:

Column 1, Line 29, delete "angular" and substitute therefor --regular--;

Column 11, Line 22, delete "closed" and substitute therefor --clocked--.

Signed and Sealed this

Third Day of August 1982

[SEAL]

Attest:

GERALD J. MOSSINGHOFF

*Attesting Officer*    *Commissioner of Patents and Trademarks*